US006746785B1

(12) United States Patent
Werner

(10) Patent No.: US 6,746,785 B1
(45) Date of Patent: Jun. 8, 2004

(54) DEVICE FOR SETTING A DEFINED ELECTRIC POTENTIAL ON A FERRITE CORE OF AN INDUCTIVE COMPONENT AND/OR FOR REDUCING DAMPING OF THE INDUCTIVE COMPONENT BY LOSSES INDUCED BY ITS MAGNETIC FIELD

(75) Inventor: Tristan Werner, München (DE)

(73) Assignee: Siemens Aktiengessellschaft, Munich (DE)

( * ) Notice: Subject to any disclaimer, the term of this patent is extended or adjusted under 35 U.S.C. 154(b) by 759 days.

(21) Appl. No.: 09/265,479

(22) Filed: Mar. 10, 1999

Related U.S. Application Data

(63) Continuation of application No. PCT/DE97/01993, filed on Sep. 8, 1997.

(30) Foreign Application Priority Data

Sep. 10, 1996 (DE) ........................................ 196 36 742

(51) Int. Cl.[7] ................................................ B32B 15/04

(52) U.S. Cl. ....................... 428/693; 428/617; 428/618; 428/681; 336/84 R; 336/84 C; 336/84 M

(58) Field of Search ............................ 336/84 C, 84 R, 336/84 M; 428/900, 693, 699, 457, 458

(56) References Cited

U.S. PATENT DOCUMENTS 3,835,370 A 9/1974 Kaiserserth et al.
4,127,110 A * 11/1978 Bullara ........................ 128/2 P
5,153,540 A * 10/1992 Gliha ........................ 333/182
5,182,427 A * 1/1993 McGaffigan ............. 219/10.75
5,312,674 A * 5/1994 Haertling .................... 428/210
5,650,759 A * 7/1997 Hittman et al. ............. 333/182
5,653,841 A * 8/1997 Krishnamurthy et al. ... 156/150
5,776,275 A * 7/1998 Krishnamurthy et al. ... 156/150
5,825,901 A * 10/1998 Hisey ......................... 381/165

FOREIGN PATENT DOCUMENTS

DE 2247017 3/1974
DE 8810709.4 11/1988
FR 2346679 10/1977

OTHER PUBLICATIONS

Japanese Patent Abstract No. 61170010 (Motoyasu), dated Jul. 31, 1986.

"Induktive Sensoren", G. Schnell, Vieweg Verlag, Braunschweig, Germany, 1991, pp. 5–14 (No Month).

* cited by examiner

*Primary Examiner*—Deborah Jones
*Assistant Examiner*—Andrew T Piziali
(74) *Attorney, Agent, or Firm*—Laurence A. Green; Werner H. Stemer; Ralph E. Locher

(57) ABSTRACT

A metal layer is bonded to the ferrite core of an inductive component. A defined electric potential is thereby set for the ferrite core of an inductive component and/or the damping of the inductive component is reduced which is caused by losses induced from its magnetic field.

7 Claims, 1 Drawing Sheet

DEVICE FOR SETTING A DEFINED ELECTRIC POTENTIAL ON A FERRITE CORE OF AN INDUCTIVE COMPONENT AND/OR FOR REDUCING DAMPING OF THE INDUCTIVE COMPONENT BY LOSSES INDUCED BY ITS MAGNETIC FIELD

CROSS-REFERENCE TO RELATED APPLICATION

This is a continuation of copending International Application PCT/DE97/01993, filed Sep. 8, 1997, which designated the United States.

BACKGROUND OF THE INVENTION

Field of the Invention

The present invention relates to a device for setting a defined electric potential on a ferrite core of an inductive component and/or for reducing the damping of the inductive component from losses induced by its magnetic field, wherein a metal layer is provided on the ferrite core.

Problems can arise in inductive components both because of an undefined electric potential on the ferrite core of the component and by damping of the component by losses, for example eddy-current losses, induced by its magnetic field. This is the case, for example, with inductors for the tuned circuits of inductive proximity switches.

Inductive proximity switches or sensors of this type contain, as active element, an inductive system consisting of an electrical winding and a ferrite core, implemented as a pot-type core. The magnetic fields produced by the electric current flowing in the winding is guided and directed by the pot-type core in such a way that it emerges from the core on only one side. If there is an object made of electrically conductive or magnetically permeable material close to the exit side, i.e. the active face of the proximity switch, then the magnetic field becomes deformed. An electrical switching signal of the proximity switch is derived from the deformation or influence.

In order for the proximity switch to operate properly, it is essential for the ferrite core to be at a defined electric potential. Due to the fact that ferrites exhibit poor electrical conductivity (which is per se desirable as regards losses in the core), conventional methods for defining the potential, for example soldering electrical conductors to it, are out of the question.

An attempt has been made in the art to overcome the problem by bringing a piece of metal into contact under pressure with the& surface of the ferrite core. However, this is disadvantageous in that, because of differing surface properties of ferrites, undefined surface resistances occur. The scatter in the contact resistance between the ferrite and the conductor is in this case relatively great. A standard deviation of approximately 1.8 kΩ can occur.

A further problem with inductive proximity switches arises when a metal tube, in particular a stainless steel tube, is used as the housing. The eddy currents induced in a tube housing of this type cause premature damping of the coil system of the proximity switch and thereby reduce the maximum switching range. In order to reduce the damping of the coil system which these eddy currents cause, a copper ring may be arranged between the coil system and the housing. As a result, the eddy-current losses are substantially reduced because the electrical conductivity of copper is orders of magnitude higher than that of the housing material customarily used (stainless steel). The premature damping of the coil system is thereby lowered and, as a consequence of this, the possible switching range of the proximity switch is increased. Reference may be had, with regard to that type of inductive proximity switch design, to "Sensoren in der Automatisie-rungstechnik" [Sensors in Automation Technology] by G. Schnell, Vieweg Verlag, Braunschweig, Germany 1991, pp. 5–10.

In those systems, however, the disadvantage arises that the relatively large tolerances of the ferrite (about 2 to 3%) always lead to a gap between the metal ring and the ferrite wall. As a result, undesireable leakage flux is caused and the switching range is reduced. Since it is required that the metal ring have a particular minimum thickness, the overall dimensions of the proximity switch are furthermore increased, in view of the above-mentioned tolerances of the ferrite.

SUMMARY OF THE INVENTION

It is accordingly an object of the invention to provide a method of setting the electrical potential and/or of reducing the damping of inductive components, which overcomes the above-mentioned disadvantages of the heretofore-known devices and methods of this general type.

With the foregoing and other objects in view there is provided, in accordance with the invention, a ferrite core assembly of an inductive component with a defined electric potential and reduced damping behavior, comprising:

a ferrite core of an inductive component;

a metal layer disposed on the ferrite core; and an electrically conductive adhesive bonding the metal layer to the ferrite core, the adhesive being selected so as to adhere and be thermally stable within an operating temperature range of the inductive component.

In accordance with an added feature of the invention, the metal layer is a copper layer.

In a first embodiment of the invention, the metal layer is a metal platelet and, in particular, a circular copper platelet. Other shapes are possible as well such as, for instance, rectangular platelets and the like.

In a second embodiment of the invention, the metal layer is a foil bonded to the ferrite core. The foil is preferably formed of copper as well.

Other features which are considered as characteristic for the invention are set forth in the appended claims.

Although the invention is illustrated and described herein as embodied in a device for setting a defined electric potential on a ferrite core of an inductive component and/or for reducing damping of the inductive component by losses induced by its magnetic field, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
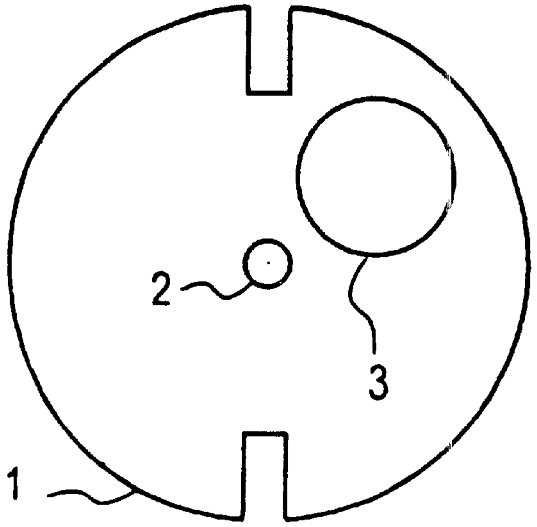
FIG. 1 is a schematic end view of a first embodiment of a ferrite core with a metal layer bonded onto it.

Referring now to the figures of the drawing in detail and first, particularly, to FIG. 1 thereof, there is seen a ferrite core 1 with a central hole 2, as may be used for an inductor of an inductive proximity switch.

According to the invention, a metal layer 3 is bonded to the core 1 with an electrically conductive adhesive. The adhesive is chosen so that it properly glues the metal layer 3 and is thermally stable in the operating temperature range of the inductive component. Such adhesives, with extremely high conductivity, a high degree of adhesion and thermal stability is known per se and it is commercially available.

The metal layer 3 may be a copper platelet of circular design and with predetermined diameter. Naturally, other shapes, for example rectangular shapes, of different size are also possible.

The Inventive Feature Offers the Following Advantages

There is very good adhesion of the metal layer to the ferrite surface.

The contact resistance between the electrically conductive metal layer and the ferrite is relatively low. Empirical measurements of the contact resistance between a copper plate with a diameter of 6 mm and ferrite show a value of 3.67 kΩ as compared with a value of 5.39 kΩ resulting in the prior art method whereby the metal plate is pressed onto the core.

An electrical connection can be made by a thermal process, for example by soldering.

The scatter in the contact resistance between the ferrite and the surface of the metal layer is small. Measurements of the contact resistance between a copper plate having a diameter of 6 mm and ferrite have given a standard deviation of 0.56 kΩ as compared with a value of 1.83 kΩ resulting from the prior art method.

Figure 2:
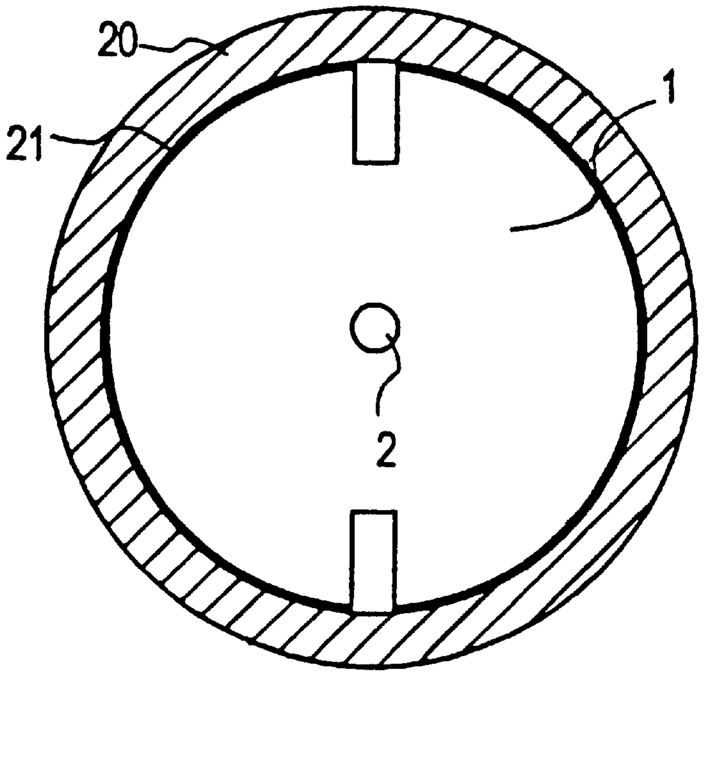
FIG. 2 is an end section of a further embodiment of a ferrite core with a metal foil bonded onto the ferrite.

Referring now to FIG. 2, which illustrates a further embodiment of the innovation and in which like parts are identified as in FIG. 1, a metal foil 20 is bonded to the surface of the ferrite core 1 with an adhesive 21. This feature renders it possible to gain good control over the problem of the above-explained damping of the inductive system by eddy currents. By virtue of the adhesive 21, the metal foil 20 is applied virtually directly to the surface of the ferrite core. This affords the advantage of avoiding the tolerance problems which occur in the context of the prior art measure of using a metal ring. Furthermore, it is possible to apply very thin layers, measuring as little as a few tens of microns ($\mu$m). Practical thickness values are, for example, from 0.01 to 0.1 mm.

I claim:

1. A ferrite core assembly of an inductive component with a defined electric potential and reduced damping behavior, comprising:

a ferrite core of an inductive component;

a metal layer disposed on said ferrite core; and an electrically conductive adhesive bonding said metal layer to said ferrite core, said adhesive being selected so as to adhere and be thermally stable within an operating temperature range of the inductive component.

2. The assembly according to claim 1, wherein said metal layer is a copper layer.

3. The assembly according to claim 2, wherein said metal layer is a copper platelet.

4. The assembly according to claim 3, wherein said copper platelet is a circular platelet.

5. The assembly according to claim 1, wherein said metal layer is a metal platelet.

6. The assembly according to claim 5, wherein the metal platelet is a circular platelet.

7. The assembly according to claim 1, wherein said metal layer is a foil bonded to said ferrite core.

* * * * *